US012752356B2

(12) United States Patent
Grinko

(10) Patent No.: US 12,752,356 B2
(45) Date of Patent: Oct. 6, 2026

(54) METHOD FOR GRINDING A WORKPIECE WITH A TOOTHING OR A PROFILE

(71) Applicant: KAPP NILES GMBH & CO. KG, Coburg (DE)

(72) Inventor: Sergiy Grinko, Coburg (DE)

(73) Assignee: KAPP NILES GMBH & CO. KG, Coburg (DE)

( * ) Notice: Subject to any disclaimer, the term of this patent is extended or adjusted under 35 U.S.C. 154(b) by 548 days.

(21) Appl. No.: 18/279,802

(22) PCT Filed: Mar. 19, 2022

(86) PCT No.: PCT/EP2022/057261
§ 371 (c)(1),
(2) Date: Aug. 31, 2023

(87) PCT Pub. No.: WO2022/207372
PCT Pub. Date: Oct. 6, 2022

(65) Prior Publication Data
US 2024/0139842 A1 May 2, 2024

(30) Foreign Application Priority Data
Mar. 30, 2021 (DE) ..................... 10 2021 108 073.8

(51) Int. Cl.
*B23F 23/12* (2006.01)
*B23F 5/04* (2006.01)
(Continued)

(52) U.S. Cl.
CPC ............ *B23F 23/1218* (2013.01); *B23F 5/04* (2013.01); *B23Q 17/099* (2013.01); *G01B 21/20* (2013.01); *G05B 19/186* (2013.01)

(58) Field of Classification Search
CPC . G01B 11/2416; G01B 5/202; B23F 23/1225; B23F 23/1218; B24B 53/075; B24B 53/085; B24B 49/02; B24B 49/04
See application file for complete search history.

(56) References Cited

U.S. PATENT DOCUMENTS 1,105,916 A 8/1914 Myers
2,998,000 A * 8/1961 Johansson .............. B24B 49/18
125/11.01

(Continued)

FOREIGN PATENT DOCUMENTS

CH 715989 A1 9/2020
CH 716583 A1 3/2021

(Continued)

OTHER PUBLICATIONS

International Search Report Dated Jun. 29, 2022 (PCT/EP2022/057261), 3 Pages.

*Primary Examiner* — Joel D Crandall
(74) *Attorney, Agent, or Firm* — LUCAS & MERCANTI, LLP; Klaus P. Stoffel

(57) ABSTRACT

A method for grinding a workpiece with a toothing or a profile, in which, in a single workpiece clamping operation in the grinding machine, the toothing or the profile is pre-machined using a rough-grinding tool in a first step and then the toothing or the profile is finished using a smooth-grinding tool in a second step. Simultaneously with the first working step, the toothing or the profile is measured by at least one sensor, wherein a geometric variable defining the toothing or the profile or a variable linked to the geometry is measured, and wherein the deviation of the measured geometric variable or of the variable linked to the geometry is determined from a target value in the machine control.

6 Claims, 7 Drawing Sheets

(51) Int. Cl.
*B23Q 17/09* (2006.01)
*G01B 21/20* (2006.01)
*G05B 19/18* (2006.01)

(56) References Cited

U.S. PATENT DOCUMENTS

| | | | | |
|---|---|---|---|---|
| 4,829,717 | A | 5/1989 | Pozzetti | |
| 5,174,070 | A | 12/1992 | Loesch | |
| 5,251,405 | A | 10/1993 | Clauss | |
| 6,234,869 | B1 * | 5/2001 | Kobayashi | B24B 5/04 451/21 |
| 6,577,917 | B1 | 6/2003 | Ronneberger | |
| 8,313,357 | B2 | 11/2012 | Heyder | |
| 10,466,037 | B1 * | 11/2019 | Bojanowski | G01B 11/14 |
| 2009/0156097 | A1 * | 6/2009 | Pilkington | B24B 49/02 451/5 |
| 2016/0175955 | A1 | 6/2016 | Ferry | |
| 2016/0214193 | A1 * | 7/2016 | Wuerfel | B23F 9/02 |
| 2017/0008110 | A1 * | 1/2017 | Mundt | B24B 53/083 |
| 2018/0128596 | A1 * | 5/2018 | Mies | G01B 11/2416 |
| 2018/0252517 | A1 * | 9/2018 | Le Neel | G01B 11/2416 |
| 2019/0339064 | A1 | 11/2019 | Bojanowski | |
| 2020/0225027 | A1 | 7/2020 | Landvogt | |
| 2022/0126384 | A1 | 4/2022 | Mueller | |
| 2022/0134459 | A1 | 5/2022 | Dietz | |
| 2022/0291669 | A1 | 9/2022 | Dietz | |

FOREIGN PATENT DOCUMENTS

| | | | |
|---|---|---|---|
| DE | 207511 | A1 | 3/1984 |
| DE | 4302353 | A1 | 8/1993 |
| DE | 19928500 | A1 | 12/2000 |
| DE | 102019104812 | A1 | 8/2020 |
| EP | 0229596 | A2 | 7/1987 |
| EP | 2149425 | A1 | 2/2010 |
| EP | 3456453 | A1 | 3/2019 |

* cited by examiner

METHOD FOR GRINDING A WORKPIECE WITH A TOOTHING OR A PROFILE

CROSS-REFERENCE TO RELATED APPLICATIONS

The present application is a 371 of International application PCT/EP2022/057261, filed Mar. 19, 2022, which claims priority of DE 10 2021 108 073.8 filed Mar. 30, 2021, the priority of these applications is hereby claimed and the applications are incorporated herein by reference.

BACKGROUND OF THE INVENTION

The invention relates to a method for grinding a workpiece with a toothing or a profile, wherein in the grinding machine in a single workpiece clamping in a first working step the toothing or the profile is pre-machined with a rough-grinding tool and subsequently in a second working step the toothing or the profile is finish-machined with a finishing grinding tool.

When producing a workpiece, in particular with a gear, it is determined how, with a certain number of machining strokes, feed rates and other parameters, the gear or a profile is first pre-machined in a roughing process and then finished in a finishing process. This process is then maintained throughout the batch of workpieces to be machined.

The roughing process is generally characterised by a higher infeed, i.e. a higher material removal rate, which is also associated with higher tool wear. In the finishing process, the final surface of the toothing or profile is produced, i.e. the finish quality. As a rule, only a small infeed is selected here, which results in a lower material removal rate and also lower tool wear.

At first, it is unknown and also not very significant how high the respective effective allowance on the workpiece and especially on the tooth flanks of the toothing as well as the blank error are. The combined roughing and subsequent finishing process should reliably remove the entire stock allowance and produce a high quality toothing or profile. Therefore, the process cannot take into account the current stock allowance or blank error. Depending on the circumstances, there is actual wear on both the roughing grinding tool and the finishing grinding tool.

Depending on the actual wear of the roughing grinding tool, there is a more or less high load on the finishing grinding tool, as it has to remove the stock remaining after roughing. It is known that during roughing the tool can be shifted axially in order to compensate wear of the tool to a certain extent.

The invention is based on the object of further developing a generic process in such a way that it is possible to make machining more efficient and, in particular, to define the optimum time for a new dressing process or for a tool change. Furthermore, it should be possible to obtain a statement about the state of wear, in particular of the roughing-grinding tool, in a simple manner.

SUMMARY OF THE INVENTION

The solution of this problem by the invention provides that simultaneously with the first working step (i.e. during rough grinding) the toothing or the profile is measured by means of at least one sensor, wherein a geometric variable determining the toothing or the profile or a variable associated with the geometry is measured and wherein the deviation of the measured geometric variable or the variable associated with the geometry from a set value is determined in the machine control.

The roughing step can be carried out in the form of a single grinding stroke. However, it can also be carried out in the form of several partial steps; in this case, several roughing strokes are carried out.

The machine control can then output a signal if the deviation between the measured geometric variable and its nominal value is above a predefined limit.

At least as a roughing grinding tool, but preferably as a roughing and finishing tool, a dressable grinding wheel or a dressable grinding worm can be used.

The same tool can also be used as a roughing grinding tool and as a finishing grinding tool, whereby different sections of the tool are provided for roughing and for finishing.

The machine control can automatically initiate a dressing process for the roughing grinding tool if the deviation between the measured geometric variable and its nominal value is above a predefined limit.

The relevant measured geometric variable is, in particular, the tooth width or the spherical measure of the toothing, whereby the nominal value is based on the dimension that should ideally be present after roughing.

The measured geometric variable can also be the profile angular error ($fH\alpha$) of the toothing.

An optical sensor (in particular using a laser), an inductive or capacitive sensor can be used as a sensor. Sensors that use eddy currents are also generally suitable.

The (in particular inductive) sensor can be measuring or switching. The measuring sensor can constantly detect the material removal on the surface of the toothing or profile and thus determine the material removal over the circumference of the workpiece. The switching sensor, on the other hand, only reacts to a certain preset signal limit and switches from “zero” to “one” and vice versa. In the latter case, it can be detected in particular at which circumferential point of a gear the ground (roughened) tooth head enters the detection range of the sensor, from which the removed allowance can be concluded. This should be noted in particular with regard to the procedure indicated above, according to which a variable related to the geometry can also be determined.

It is also possible that the measurement of the toothing or the profile during roughing is carried out with at least two sensors that are offset in the direction of the axis of rotation of the workpiece, but are arranged at the same circumferential position of the workpiece. Alternatively, it can also be provided that the measurement is carried out with at least two sensors that are offset in the direction of the axis of rotation and arranged at different circumferential positions of the gear. This can prove to be very advantageous for reasons of the available installation space. Another alternative possibility is that the measurement is carried out with a single sensor that is arranged so that it can move in the direction of the axis of rotation of the workpiece.

With this, an improved data basis can be obtained in order to be able to conclude even more reliably on the wear condition of the roughing grinding tool.

The proposed concept is therefore based on a temporally parallel measurement of the toothing during rough grinding. For example, the (e.g. inductive) sensor is in an axial position that corresponds to the centre of the toothing (see FIG. 1 below) and records the signals of the tooth gaps or tooth flanks. When the grinding wheel or grinding worm passes through this axial position, the tooth thickness or tooth width of the toothing changes. The sensor detects this change, the machine control compares the detected value with a predefined limit value and reacts depending on it.

It is thus proposed to measure the workpieces to be ground, preferably over the width of the gear or profiling, during roughing and to make a statement about the condition of the roughing grinding tool based on the measurement made.

The invention is based on the finding that the grinding tool, in particular the grinding worm, is mostly stressed during roughing; this is when wear occurs the most. As mentioned, the preferred assessment criterion is the profile angle error of the toothing or the diametral spherical measure or the tooth width, for which the corresponding nominal values determined during roughing are used as a basis.

The tooth width is the distance between two flat measuring surfaces placed tangentially to the tooth flanks, with a defined number of teeth between the measuring surfaces during measurement. The tooth width can be used to determine the thickness of the teeth. It is suitable as a simple quality inspection method for the ground gear.

The spherical measure (or roll size) is also a parameter for determining the tooth thickness of the toothing, whereby balls (or rollers) are inserted into diametrically opposed tooth spaces in the toothing and the distance between the balls (or rollers) is determined. Accordingly, this measurement is also a determinant of the tooth thickness and is suitable as a quality inspection method for the ground gear.

The profile angle deviation $fH\alpha$ is generally described by the deviation of the actual angular position of the involute of a tooth flank from the nominal angular position (in practice, it is actually the deviation of the angular position of the flank profile, since on the measuring protocol commonly used here, not the involute, but only the deviation of the profile modification with respect to the nominal modification is shown). Thereby, the shape deviation is not taken into account.

After finishing, these parameters are no longer useful for assessing the rough-grinding tool, since finishing has produced a perfect surface of the toothing or profile. This is true at least as long as the finishing stroke is able to eliminate all defects that are still present after roughing.

The proposed concept thus focuses on in-process monitoring of geometric parameters of the workpiece to be machined and enables effective wear control of the rough-grinding tool. Thus, an efficient way of monitoring the grinding process and an adaptive control of the machining is made possible.

In a very advantageous way, an assessment of the wear condition of the rough-grinding tool can be made without the need for separate times for measuring; rather, the measuring takes place in parallel with the roughing.

BRIEF DESCRIPTION OF THE DRAWING

The drawing shows examples of embodiments of the invention.

DETAILED DESCRIPTION OF THE INVENTION

The productivity of the grinding process, in particular during generative grinding of a toothing 2 of a gear wheel 1 (see FIG. 1), is primarily determined by the dressing interval or the achievable number of workpieces between two dressing operations in the preferred case of using a dressable grinding tool. Between the dressing operations, the grinding tool wears out mainly during the roughing of the toothing.

Measuring a grinding worm to determine its wear is costly and difficult. The present concept is based on the idea that a measurement is carried out during the roughing of the toothing in the grinding machine in order to be able to conclude the wear of the rough-grinding tool. Advantageously, this means that there is no non-productive time for the necessary measurement process.

In addition to the tooth width and the spherical measure, which can be used for this purpose, the profile angle error $fH\alpha$ also comes into consideration. These geometric parameters are measured during roughing. The workpiece remains in the grinding machine. A measuring system is arranged in the machine to measure the geometric parameters mentioned.

Figure 1:
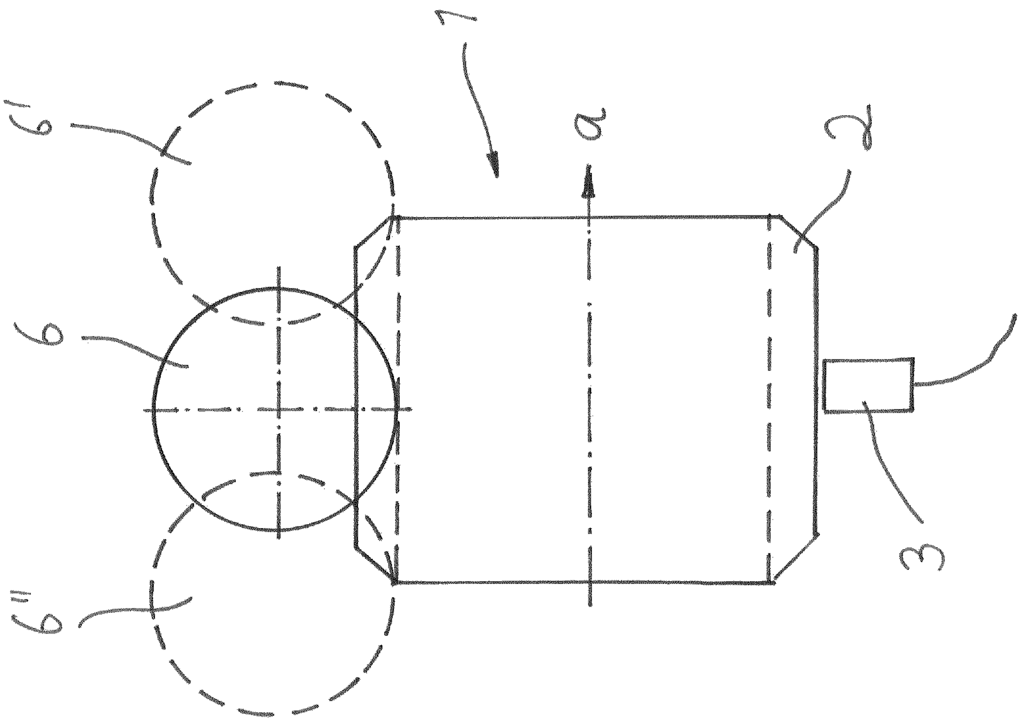
FIG. 1 schematically shows a gear wheel during machining by means of a rough-grinding tool, with the start and end of rough-grinding indicated, FIG. 2 schematically shows a tooth of the toothing of the gear wheel, which is measured with a sensor, whereby the contact point K is shown, at which the sensor picks up a signal.

FIG. 1 shows schematically how a workpiece in the form of a gear wheel 1 is ground by means of a grinding worm 6, whereby here the grinding worm 6 is designed as a roughing worm. When roughing the toothing 2 of the gear wheel 1, the grinding worm 6 is shifted relative to the workpiece 1 in the direction of the rotation axis a of the gear wheel 1 until the toothing 2 is roughened over its entire axial extent. In FIG. 1, position 6' indicates the grinding worm entering the toothing 2, while position 6" marks the end of rough grinding. While the grinding worm 6 is engaged with the toothing 2 during roughing, the grinding worm 6 and the gear wheel 1 rotate simultaneously in a known manner.

At a point offset or remote from the engagement between the grinding worm 6 and the toothing 1 in the circumferential direction of the gear wheel 1, a sensor 3 is arranged (here: axially centrally in the toothing 2), which is designed here as an inductive sensor and can detect whether the tooth head with the adjacent tooth flanks is in the area of the sensor 3 or whether the tooth gap located between two teeth passes the sensor 3.

Figure 2A:
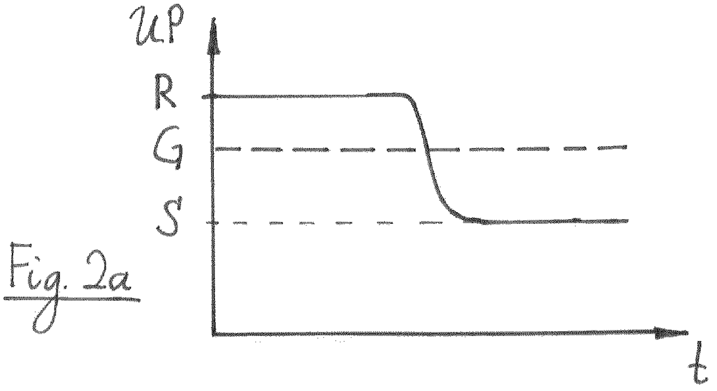
FIG. 2*a* shows schematically the course of the detected sensor signal for the contact point K during roughing over time, whereby a rough-grinding wheel with little wear is used, FIG. 2*b* schematically shows the progression of the detected sensor signal for contact point K during roughing over time, using a somewhat more worn but still usable roughing grinding wheel, FIG. 2*c* schematically shows the progression of the detected sensor signal for contact point K during roughing over time, using a rough-grinding wheel that is still further worn but still just usable, FIG. 2*d* schematically shows the progression of the detected sensor signal for contact point K during roughing over time, using a heavily worn and no longer usable rough-grinding wheel.
Figure 2B:
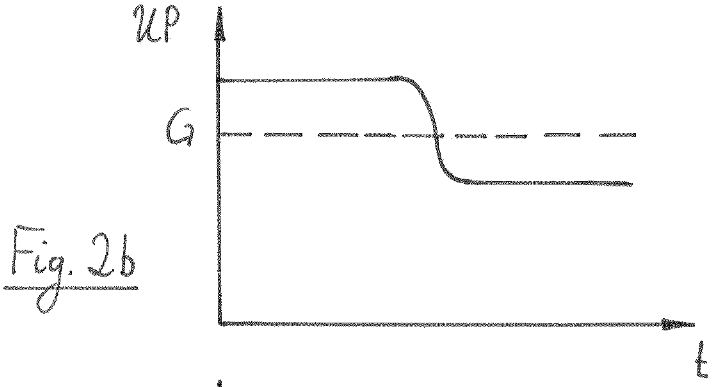
Figure 2C:
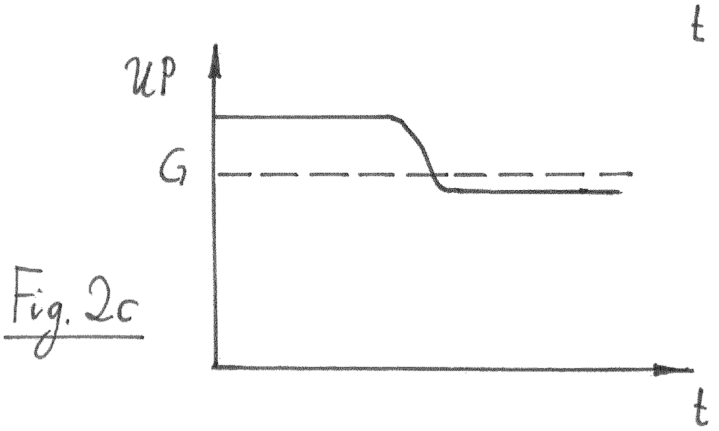
Figure 2D:
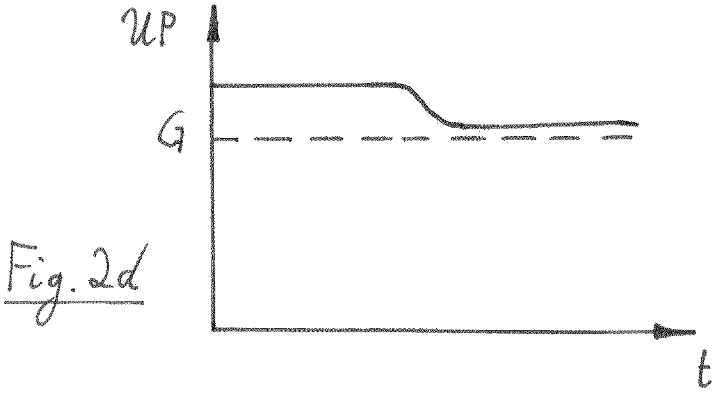
Figure 2:
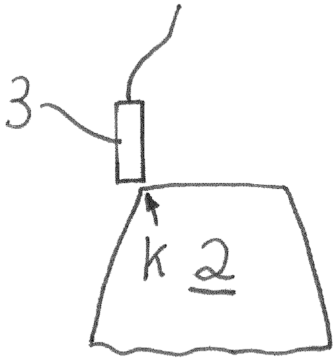

In this regard, reference is made to FIG. 2, where it is schematically shown how the gear wheel 1 with the toothing 2 rotating under the sensor 3 passes the sensor 3, so that the sensor 3 can detect the contact point K at which the toothing 2 enters the detection range of the sensor 3. The roughing process removes material (allowance) from the tooth flank of the toothing 2 so that the circumferential position UP (see FIGS. 2*a* to 2*d*) at which the sensor 3 detects a signal depends on the amount of allowance removed from the tooth flank of the toothing 2.

This is illustrated in FIGS. 2*a* to 2*d:*

FIG. 2*a* shows that the measured circumferential position UP of a tooth of the toothing 2 is initially at a raw part value R (here the full stock allowance is still on the tooth flank). When the tool 6 is then guided through the toothing over a grinding stroke (see FIG. 1), a reduced roughing value S is measured at the axial position where the sensor 3 is located due to the removal of stock from the tooth flank.

It does not need to be explained in more detail here that by means of a corresponding electronic evaluation of the signal of the sensor 3 during the rotation of the gear wheel 1 via the sensor 3, a large number of tooth entries and tooth exits must be detected and assigned to a corresponding tooth. However, once the number of teeth of the gear wheel is known, the sensor data recorded in each case can be assigned to the individual teeth so that the respective contact points K (see FIG. 2) for each tooth of the toothing 2 can be determined for the individual teeth both for the tooth entry and for the tooth exit from the area of the sensor 3.

As a variant of this procedure, it is also possible not to carry out the signal assignment for the individual teeth of the toothing, but to record the data for all teeth and then to form an average value, which thus indicates the average allowance that was removed by roughing. In generative grinding, the geometry in all the teeth of the toothing is generated in essentially the same way, which is why it can be advantageous in this case to calculate an average value of the stock removed and compare it with a reference value (i.e. nominal value) to be removed by roughing. This also corresponds to the practice in gear measuring in a measuring machine, when the values for the tooth width or for the spherical measure are measured and averaged.

As can be seen in FIG. 2*a*, the stock removal on the tooth flank results in the drop from the raw part value R to the roughing value S shown schematically in this figure when the grinding worm passes the axial point of the toothing 2 at which the sensor 3 is arranged. Also shown in this figure is a limit value G, which indicates the degree to which the roughing operation must be carried out in order to ensure perfect roughing and not to overload the subsequent finishing operation.

In general, for each individual tooth of the gear wheel there is a corresponding raw part value R and then also a specific allowance to be roughened from the tooth flank in order to achieve the limit value G.

The mentioned limit value G thus corresponds to the target geometry that should be achieved after roughing. The roughing value S corresponds to the actual geometry after roughing.

FIG. 2*b* shows that the roughing tool is at an advanced stage of wear and that slightly less stock has been removed, but that the stock has still fallen below the limit value G. The roughing process is therefore still proceeding correctly.

FIG. 2*c* shows that the wear is now just below the limit value, but that the roughing tool has now reached the end of its service life and will soon have to be re-dressed.

If the tool is not dressed again, the result would be as shown in FIG. 2*d*: The roughing process has not removed enough material from the tooth flank, so that the value no longer falls below the limit value G. This means that the roughing process is no longer carried out properly, so that the finishing tool is subjected to increased load during the subsequent finishing process.

By evaluating the recorded signals in the machine control, it is thus possible to clearly determine when the roughing tool is worn to the point where it needs to be dressed again without additional measuring time.

For the measured value of the circumferential position UP (in relation to the limit value G), a maximum still acceptable value can therefore be specified up to which work can continue with the rough-grinding tool. If the value falls below the limit value G, the grinding machine automatically triggers the dressing of the rough-grinding tool 6.

In FIG. 2 the measuring system is indicated by the sensor 3, which measures the toothing 2 of the gear wheel 1, whereby the gear wheel is rotated about its rotational axis a. This makes it possible to measure the roughed surface of the toothing 2 and in particular to determine the geometric parameters mentioned.

Figure 3:
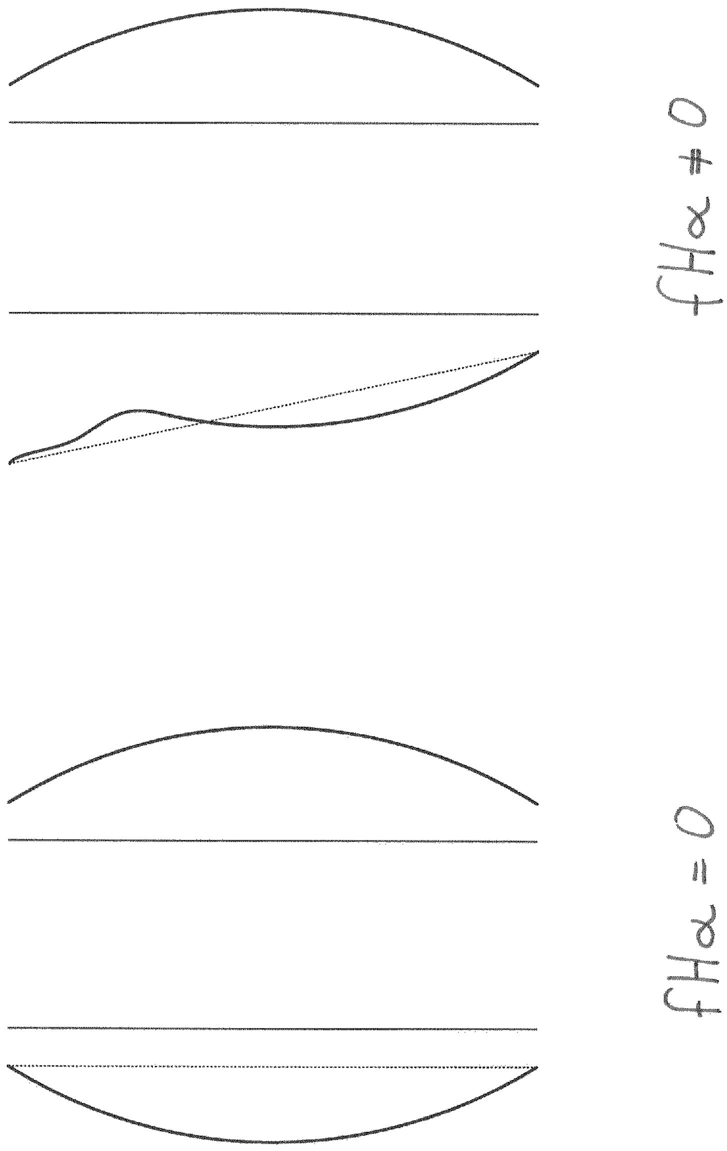
FIG. 3 shows a schematic representation of the profile angle deviation $fH\alpha$ of a toothing that has been properly rough ground (left) and a toothing that has been ground with a rough grinding tool that is already worn out (right), FIG. 4 schematically shows the measurement of a geometrical parameter of the toothing of a gear wheel according to a first embodiment of the invention, FIG. 5 schematically shows the measurement of a geometrical parameter of the toothing of a gear wheel according to a second embodiment of the invention, FIG. 6 schematically shows the measurement of a geometrical parameter of the toothing of a gear wheel according to a third embodiment of the invention, and FIG. 7 schematically shows the measurement of a geometrical parameter of the toothing of a gear wheel according to a fourth embodiment of the invention.

FIG. 3 shows schematically how the profile angle of the toothing 2 results from the measurement carried out. In the left partial image in FIG. 3 it can be seen that the profile angle error $fH\alpha$ is zero, i.e. the roughing operation was carried out correctly. However, in the right partial image in FIG. 3, it can be seen that a profile angle error $fH\alpha$ other than zero occurs when the roughing grinding tool is now already worn. It can be seen that after roughing, too much material has remained on the tooth flank of the toothing in the tooth tip area (top); accordingly, the rough-grinding tool, in particular the rough-grinding worm, is worn in the corresponding root area.

A maximum still acceptable value can also be specified for the profile angle error $fH\alpha$ up to which work can continue with the rough-grinding tool. If this limit value is exceeded, the grinding machine automatically initiates dressing of the rough-grinding tool.

Accordingly, for the series production of the gear wheels, an error limit integrated into the process is defined for a geometric parameter. Since the service life of the rough-grinding tool is usually sufficiently long, the production process can be programmed in such a way that after a certain number of ground parts the said measurement is taken and then it is assessed whether the error limit has already been reached or not. In this way, depending on the given situation of the pre-machining of the gear wheels to be ground, the service life of the roughing tool can be optimally utilised. Dressing is only carried out when it is actually necessary. At the same time, the finishing tool is optimally protected against premature wear.

A dressing of the rough-grinding tool is therefore carried out in time so that the finishing grinding tool is not in danger of not being able to correct the remaining defects from the roughing operation.

In this respect, the ideal case to strive for would be that the dressing of the rough-grinding tool takes place as precisely as possible when the specified error limit is reached exactly. The potential of the rough-grinding tool would thus be utilised in the best possible way.

The proposed procedure can also avoid premature dressing of the rough-grinding tool, as it can be determined that it is still sufficiently fit for purpose.

As an alternative to a new dressing process of the grinding tool, in particular of a grinding worm, it is also possible to use another working area of the grinding tool, i.e. in particular of the grinding worm, which can be done by shifting the tool in its axial direction.

Theoretically, it would also be possible to carry out the described measurement only after finishing and then indirectly conclude on the wear of the roughing tool. However, since the finishing process has already eliminated defects from the roughing process, such a procedure would be much less effective than the proposed way.

Whereas separate grinding wheels or grinding worms are used for roughing and finishing when using non-dressable grinding tools (e.g. steel base body tools coated with CBN), often only a single worm is used for roughing and finishing when using dressable grinding tools and especially a grinding worm.

Various possibilities for carrying out the explained measurement of the geometric parameter after roughing and before finishing are shown in FIGS. 4 to 7.

Figure 4:
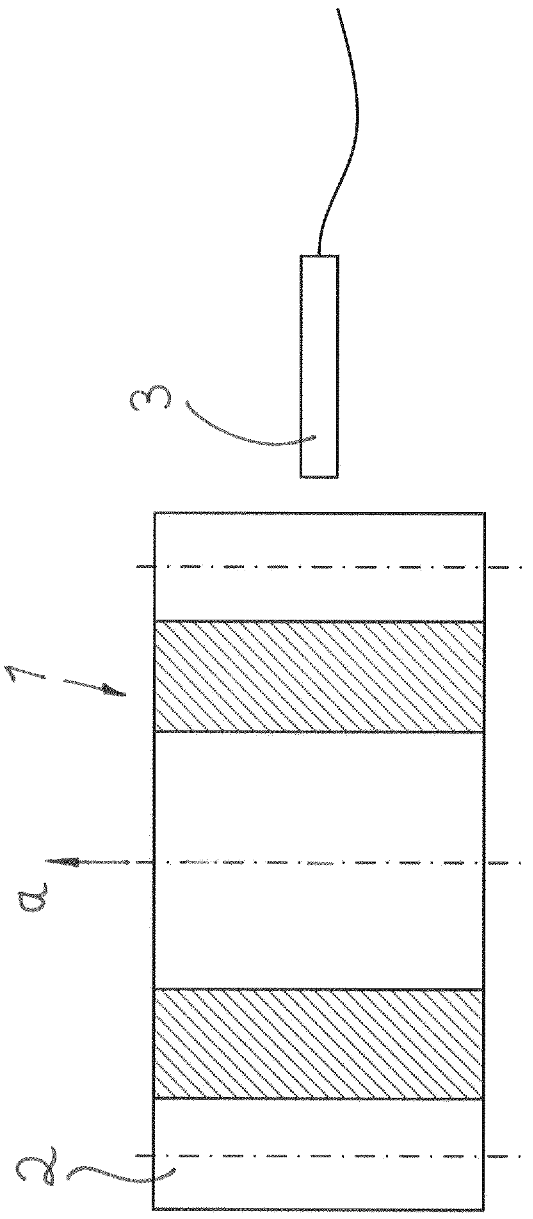

In the case of FIG. 4, a (single) sensor 3 is used to measure the tooth flanks of the roughened toothing 2. Here, as for all other measurements described, any type of sensor can be used, in particular optical sensors that measure using a laser.

Figure 5:
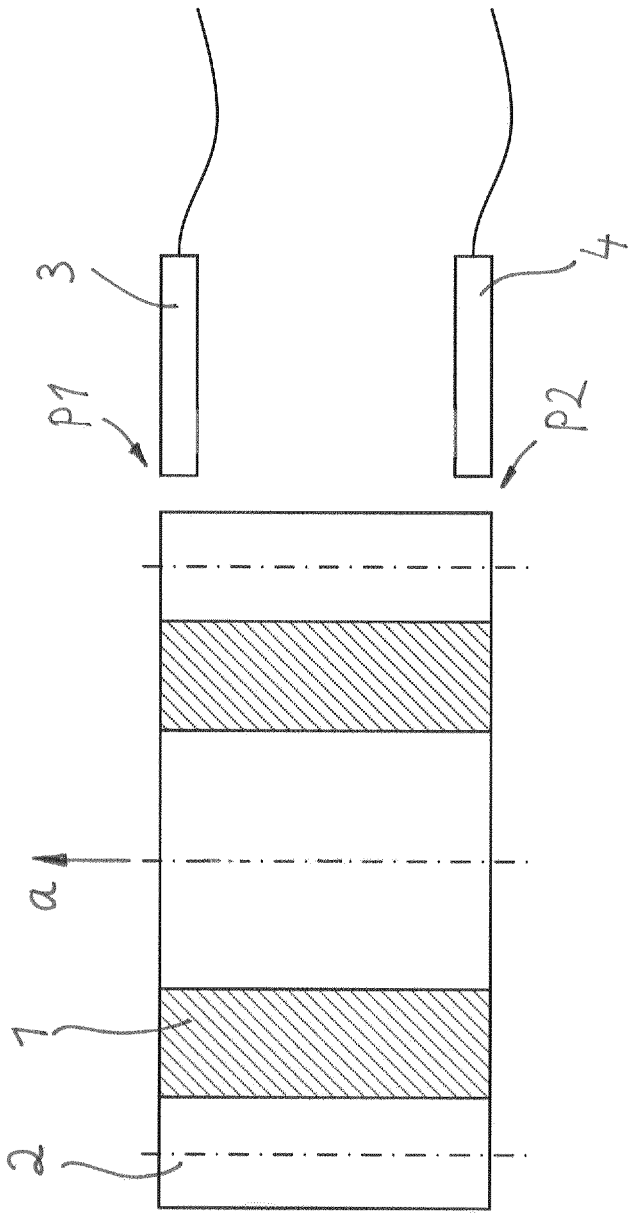

In the solution shown in FIG. 5, two sensors 3 and 4 are used, which take their respective measurements at two axially offset positions P1 and P2. The two sensors 3 and 4 are located approximately in the two axial end areas of the toothing 2 and measure the roughened surface of the tooth flanks.

The signals from the sensor or sensors are received by the machine control (not shown), which can determine what the shape of the tooth flank is when the workpiece 1 rotates, taking into account the associated signals from the sensors.

Of course, more than two measuring points can be provided in order to obtain an improved database. This is particularly useful if the profile angle error fHα is to be recorded.

Figure 6:
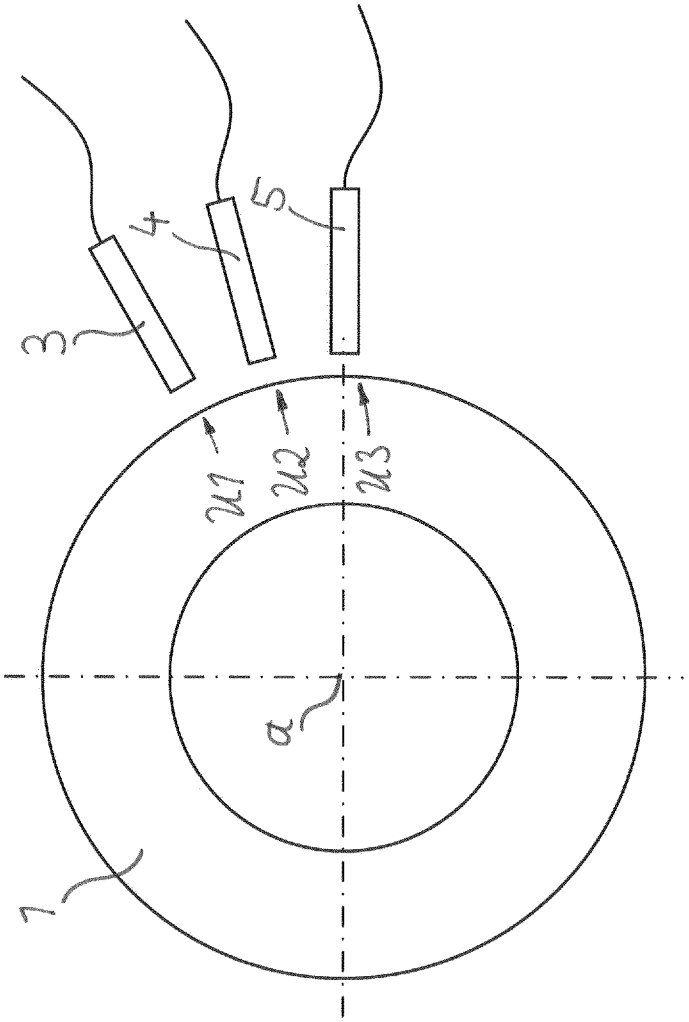

FIG. 6 shows that the measurement is carried out with several sensors, here with the three sensors 3, 4 and 5, offset in the direction of the rotation axis a and at the same time also offset in the circumferential direction. The three sensors 3, 4, 5 are arranged at different circumferential positions U1, U2 and U3. In this way it can be achieved, particularly in the case of limited installation space, that all the required sensors can nevertheless be accommodated in a space-saving manner. This applies in particular in the case of a small tooth width.

Figure 7:
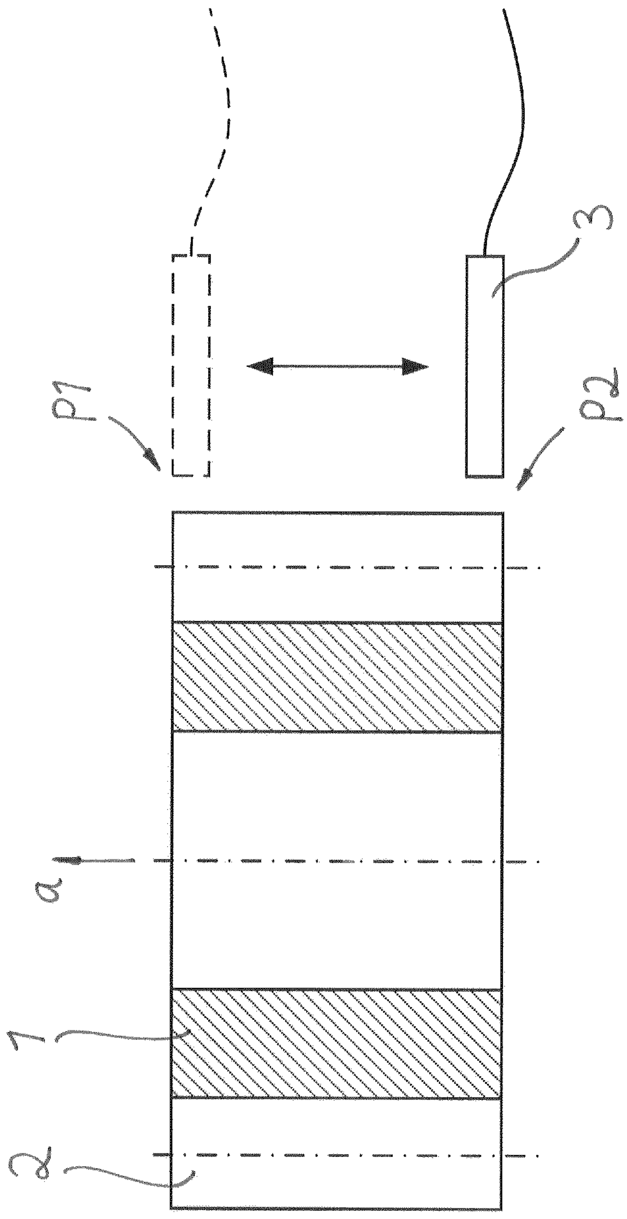

FIG. 7 shows a variant in which a measurement can be made in several planes with only one sensor 3. For this purpose, the sensor 3 is moved axially in the direction of the double arrow and the measured signals are recorded at the same time. Thus, a spiral-shaped signal is recorded here, from which the machine control can determine the surface of the tooth flank at the respective location of the sensor 3. Of course, it is also possible to carry out the measurement with the sensor in a fixed position and then successively move it axially for measurement in several planes.

The sensors 3, 4, 5 can either be housed separately or in one housing.

For all measurements, the machine control can determine from the (current) position of the sensor(s) and the rotational position of the gear wheel 1 where the surface of the measured tooth flank is located, so that the required information about the surface can be obtained during roughing.

This means that if the relative positioning of the sensors to each other is known, it is possible to determine the position of the surface of the tooth flanks by converting the signals from the sensors accordingly, taking into account the geometry of the gear (in particular the helix angle in the case of helical gearing).

LIST OF REFERENCES

1 Workpiece (gear wheel)
2 Toothing
3 Sensor
4 Sensor
5 Sensor
6 Rough-grinding tool (grinding worm)
6' Position of the grinding tool at the start of roughing
6" Position of the grinding tool at the end of roughing
a Rotation axis of the gear wheel
P1 First axial position
P2 Second axial position
U1 First circumferential position
U2 Second circumferential position
U3 Third circumferential position
fH□ Profile angle error
K Contact point
UP Circumferential position of the gear wheel
t Time
G Limit value
R Raw part value
S Roughing value

The invention claimed is:

1. A method for grinding a workpiece with a toothing or a profile, wherein in the grinding machine in a single workpiece clamping in a first working step the toothing or the profile is pre-machined with a rough-grinding tool and subsequently in a second working step the toothing or the profile is finish-machined with a finishing grinding tool, wherein simultaneously with the first working step, the toothing or the profile is measured by means of at least one sensor, wherein a geometric variable determining the toothing or the profile or a variable connected to the geometry is measured, and wherein the deviation of the measured geometric variable or the variable connected to the geometry from a setpoint value is determined in the machine control, wherein a dressable grinding wheel or a dressable grinding worm is used at least as rough-grinding tool, wherein the machine control initiates a dressing operation for the rough-grinding tool if the deviation between the measured geometric variable and its setpoint value is above a predetermined limit, wherein the measured geometric variable is the tooth width or the spherical measure of the toothing.

2. The method according to claim 1, wherein the machine control emits a signal if the deviation between the measured geometric variable and its setpoint value is above a predetermined limit.

3. The method according to claim 1, wherein the same tool is used as the rough-grinding tool and as the finishing-grinding tool, wherein different sections of the tool are provided for roughing and for finishing.

4. The method according to claim 1, wherein an optical sensor, an inductive sensor or a capacitive sensor is used as the sensor.

5. The method according to claim 4, wherein the measurement of the toothing or the profile is carried out with at least two sensors which are arranged offset in the direction of the rotation axis of the workpiece.

6. The method according to claim 4, wherein the measurement of the toothing or the profile is carried out with at least two sensors which are arranged offset in the circumferential direction of the workpiece.

* * * * *